United States Patent [19]

Serfling et al.

[11] 4,169,050
[45] Sep. 25, 1979

[54] BUOYANT CONTACT SURFACES IN WASTE TREATMENT POND

[75] Inventors: Steven A. Serfling; Dominick Mendola, both of Leucadia, Calif.

[73] Assignee: Solar Aquasystems, Inc., Encinitas, Calif.

[21] Appl. No.: 848,092

[22] Filed: Nov. 3, 1977

[51] Int. Cl.² .............................................. C02B 1/28
[52] U.S. Cl. ........................................ 210/12; 210/17; 210/150; 210/170; 210/220; 210/242 R
[58] Field of Search ................... 210/2, 6, 10, 11, 12, 210/14, 15, 17, 150, 151, 170, 220, 242 R, 242 A; 261/94, 100, 119 R, 124, DIG. 70, DIG. 79

[56] References Cited

U.S. PATENT DOCUMENTS

| 3,231,490 | 1/1966 | Fry | 210/17 |
|---|---|---|---|
| 3,275,147 | 9/1966 | Gilde | 210/17 |
| 3,462,275 | 8/1969 | Bellany | 210/10 |
| 3,497,185 | 2/1970 | Dively | 210/242 A |
| 3,521,864 | 7/1970 | Welles | 210/242 A |
| 3,617,541 | 11/1971 | Pan | 210/17 |
| 3,700,590 | 10/1972 | Burton | 210/150 |
| 3,770,623 | 11/1973 | Seidal | 210/2 |
| 3,810,832 | 5/1974 | Rhodes | 210/170 |
| 3,933,628 | 1/1976 | Varani | 210/12 |
| 4,057,401 | 11/1977 | Boblitz | 210/12 |
| 4,088,571 | 5/1978 | Helgesson | 210/17 |

FOREIGN PATENT DOCUMENTS

| 658907 | 5/1965 | Belgium | 210/2 |
|---|---|---|---|
| 2129660 | 6/1971 | Fed. Rep. of Germany | 210/11 |
| 2726167 | 12/1977 | Fed. Rep. of Germany | 210/150 |

OTHER PUBLICATIONS

Green Systems for Waste Water Treatment, Environment Science & Technology, vol. 9, No. 5, May 1975, 408–409.

"Wastewater Renovation and Reuse," Malcom S. Gordon, published by Marcel Dekker, Inc., New York, 1977, 133–147.

Primary Examiner—Charles N. Hart
Assistant Examiner—Ernest G. Therkcorn
Attorney, Agent, or Firm—Warren, Chickering & Grunewald

[57] ABSTRACT

A wastewater treatment and reclamation system using natural ecological processes consisting of ponds; greenhouse pond cover; pollution-consuming, floating aquatic plants; high-surface-area, submerged, activated bio-web substrates for greatly increasing fixed bacterial film area and activity; aeration co-functioning with the bio-web substrate for accelerating bacterial metabolism and/or solar heat transfer, mixing and aerating the water body; and a polyculture of micro-invertebrates, fish and shellfish providing a balanced food chain for maximum removal and bio-concentration of nutrients and organics from the wastewater.

13 Claims, 4 Drawing Figures

BUOYANT CONTACT SURFACES IN WASTE TREATMENT POND

BACKGROUND OF THE INVENTION

1. Field of Invention

The invention relates to wastewater treatment systems using ponds or lagoons as holding areas and for biological treatment of sewage, industrial and agricultural wastewater and the like.

2. Description of Prior Art

Conventional sewage treatment processes, which have proven adequate with no major design changes for many years, are now recognized as inadequate to meet the present Federal water pollution control regulations and other developing standards without extensive modification, additions and high construction costs. Such conventional systems are also costly to operate, have high electrical demands, and consume precious natural resources, including fossil fuels, chemicals and water. Such processes are inadequate of removing or detoxifying the majority of the most harmful components of modern day wastewater, e.g., pesticides, herbicides, phenols, heavy metals, and a host of complex domestic and industrial chemicals now recognized as potentially carcinogenic. Moreover, existing systems were not designed or intended to fulfill the pressing need for reclaiming for re-use the large quantities of water which are currently being discharged into the oceans, rivers, streams, and the like. Conventional sewage treatment processes, such as trickling filters or activated sludge, are dependent on the growth, survival, productivity, and harvesting of bacteria to provide treatment. However, these systems are essentially a monoculture, e.g., bacteria only, and are inherently less stable and efficient than multi-species, polyculture systems containing a variety of bacteria, invertebrates, and sludge grazers, algae, plants, and the like. A recent study by the U.S. Environmental Protection Agency, "Economic Assessment of Wastewater Aquaculture Treatment Systems" (Upton B. Henderson and Frank S. Wert, Environmental Protection Agency Report No. 600/2-76-293, 1976), evaluated eleven different aquaculture-type treatment systems utilizing polyculture lagoons containing a variety of aquatic plants, algae, invertebrates and fish. These were compared to three different conventional treatment methods (activated sludge, trickling filters, etc.) and in all cases the aquaculture systems reduced projected treatment costs as much as 94% of conventional technology methods.

In recent years, ecological-type lagoon wastewater systems using balanced food chain organisms have proven successful at capturing nutrients, concentrating chemicals, metabolizing organic compounds, detoxifying dangerous synthetic chemicals, and eliminating pathogenic bacteria and viruses. A few of the more interesting projects in the U.S. are summarized as follows:

Mississippi. Research by the National Aeronautics and Space Administration in Bay St. Louis, Mississippi, has recently demonstrated that one acre of water hyacinths can remove over 3,500 pounds of nitrogen and 800 pounds of phosphorus per year, as well as remove and metabolize over 18,000 pounds of phenol, a toxic organic pollutant, and absorb 44,000 gm. of trace heavy metals per acre per year, see the article, "Application of Vascular Aquatic Plants for Pollution Removal, Energy and Food Production in a Biological System" (B. C. Wolverton, R. M. Barlow and R. C. McDonald, *Biological Control of Water Pollution*, J. Tourbier and R. Pierson, eds., pp. 141–149, 1976).

Texas. The Texas Department of Health Resources and the City of Austin have operated a small, 4-pond (0.14 ac. total) wastewater treatment system which utilizes a combination of water hyacinths, other vascular aquatic plants, micro-invertebrates and fish and shrimp to concentrate the sewage nutrients into an easier harvest form. The ecological system has been operated for 18 months in various modes and has shown the ability to reduce the throughput $BOD_5$ by 97%, suspended solids by 95%, total nitrogen by 65%, and phosphorus by 20%. Fecal coliforms have also been reduced 98% through the natural biological processes, see article, "Water Hyacinth Culture for Wastewater Treatment" (Ray Dinges, Texas Department of Health Resources, Division of Wastewater Technology and Surveillance, Austin, Texas, 1976).

Oklahoma. The Oklahoma Department of Health has operated for 18 months a series of six, 6.5-acre waste treatment lagoons. The last four acres were stocked with a polyculture of fishes, including channel catfish, fat-head minnows, golden shiners, and Tilapia. The fish feed on the micro-invertebrates which in turn feed on the luxuriant growth of algae generated by the sewage nutrients. The quality of effluent from this food chain proved to be far superior to effluent from the same system operated without the fish present. Analysis of water samples from the third through sixth cells, and 179 samples of fish flesh, taken over the course of the study showed no presence of pathogenic virus or bacteria in any of the samples, even though no chlorination of the original raw sewage was made, see article, "Aquaculture as an Alternative Treatment System" (R. Leroy Carpenter, Mark S. Coleman, and Ron Jarman, *Biological Control of Water Pollution*, J. Tourbier and R. Pierson, eds., pp. 215–224, 1976).

Michigan. In Michigan 2 MGD of secondary effluent is being treated in an intensely managed aquatic and terrestrial nutrient recycling system consisting of 38 acres of lakes, 3 acres of marsh, and 314 acres of irrigated land. The effluent from the system exceeds all Federal Standards for reuse. In Muskegon County, Michigan, 27 MGD of effluent is applied to 11,000 acres of land, 4,500 acres of which are planted to corn. The corn yields are about twice the county average, and revenues from their sale reduce waste treatment costs to only 24¢/1,000 gallons. See following articles: "Utilization of Natural Ecosystems for Wastewater Renovation," Kenneth R. Voight, Institute of Water Research, Michigan State University, Report No. Y005065, 1976; "Wastewater: Is Muskegon County's Solution Your Solution?", John S. Walker, Environmental Protection Agency Report No. 905/2-76-004, 1976.

Long Island. A marsh/pond system in Long Island, stocked with natural marsh plants, fish, invertebrates, and attracting numerous wildfowl and game, has been continously receiving 10,000 gallons per day of raw sewage for three years. Operating through all seasons and with widely fluctuating loads, the effluent has always achieved potable quality and is used for groundwater recharge by natural percolation, see article, "Meadow/Marsh Systems as Sewage Treatment Plants" (Maxwell M. Small, Brookhaven National Laboratory, New York, NTIS Report No. BNL-20757, 1975).

California. The Los Alisos Water District in Orange County has disbanded a relatively new, but troublesome conventional activated sludge plant in favor of four well managed aerated lagoons. The 1.6 MGD effluent is totally recycled for farming of barley, tomatoes and peppers, irrigation of a commercial sod farm, and land application. The percolated effluent from the land application is then collected in holding reservoirs and will be used to maintain a beautiful lake for boating and swimming by the same families that produced the sewage. User costs have been reduced by the sale of effluent and the district is totally self-supporting without government funds.

In spite of the increased treatment efficiency of lagoons using improved techniques, most ecological lagoon systems such as listed above still suffer from the lack of reliability due to seasonal fluctuations and excessive land requirements.

SUMMARY OF THE INVENTION

The wastewater reclamation system of the present invention uses a combination of natural ecological processes, including an aerated lagoon; submerged, high-surface-area, activated bio-web substrates providing a fixed bacterial film for increasing bacteria treatment area; floating aquatic plants for wastewater nutrient removal; a polyculture of micro-invertebrates, fish, and shellfish in a balanced food chain for maximum removal and bio-concentration of nutrients and organics from the wastewater; channels for control of distribution and movement of influent and effluent water and for the controlled polyculture of aquatic plants, invertebrates and fish at maximum processing efficiency levels; and a solar-heated, greenhouse-type pond cover for maintaining elevated water temperatures to increase the interreacting organisms.

The foregoing, among others, provides the following advantages:

(1) Less construction expense: for achieving secondary water quality the system is approximately 50% less expensive to construct and operate than conventional secondary treatment systems. For achieving advanced quality or potable water, the present system can save up to 75% of the cost of average conventional tertiary systems. Further, because the system can be located in each community for treatment and direct recycling of reclaimed water, expensive sewage transportation lines and pumping costs are greatly reduced.

(2) Reduction of operating costs: the present system uses low energy processes, including solar radiation for heating and oxygen production, and minimum use of electricity for pumping requirements. Methane, as a by-product of the system, may be used to provide the electrical energy requirements. Need for expensive chemicals is also eliminated.

(3) Safety, reliability and flexibility: the present system is readily modularized for operation in combinations of parallel and series flow, allowing shut-down, independent performance monitoring or adjustment of any component without interfering with overall wastewater management. The modular system, for example, readily affords a four-step process through primary, secondary, and two-step tertiary, with the most dependable treatment techniques and hardiest organisms in the first two stages, providing greater buffering capability and reliability. The system and choice of organisms are designed to also allow an elasticity factor of at least 10 in terms of short- or long-term nutrient load changes, in contrast to bacteria or phytoplankton systems, which must receive relatively constant nutrient input to operate at designed efficiency levels. Finally, because the system is modularized, expansion can be readily effected as needed.

(4) Economizing land use: the system requires less than 1/10 to 1/50 the land area used by conventional lagoon-type treatment systems, and thus can be used in urban as well as rural areas.

(5) Year-round efficiency: the solar-heating system provides for retention of heat in both the water and the air during colder, winter months, thereby maintaining operating efficiencies of highly productive tropical species year-round. This feature also eliminates the need for expensive, oversized facilities designed to meet treatment requirements during the least efficient period of colder, winter months.

(6) No unpleasant odors and unsightly ponds, waste lagoons and treatment tanks: all of these are eliminated by the combination of the solar cover and well oxygenated, balanced ecosystem, thereby allowing location of the operation in urban areas.

(7) Pathogenic bacteria and viruses are eliminated naturally: natural biochemical processes of the polyculture system, including endogenous metabolism and food chain consumption, reduce the danger of disease and the amount of chemical treatment required for purification.

(8) Year-round harvest of fish, shrimp and high protein aquatic plants: these valuable by-products can provide fresh food for each community and help defray operating costs. The high protein aquatic plants can be harvested to provide organic mulch, compost, supplemental livestock feed, or for anaerobic fermentation to produce methane.

(9) Reduction of total dissolved salt content: customarily TDS increases in the conventional lagoon treatment. A TDS reduction is achieved in the present system by the combined action of the solar cover reducing evaporation, and the cultured plants, fish and shrimp bio-mass removing minerals from the system.

(10) Job creation, community participation, recreation: rather than depending on electricity, chemicals and extensive automatic equipment as required in conventional systems, the system of the present invention provides more satisfying jobs for both direct operation and associated activities generated by resource recovery operations and products. The by-product industry and recreational activity potentials provide numerous opportunities for community participation and benefits from an otherwise negatively viewed necessity of life.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
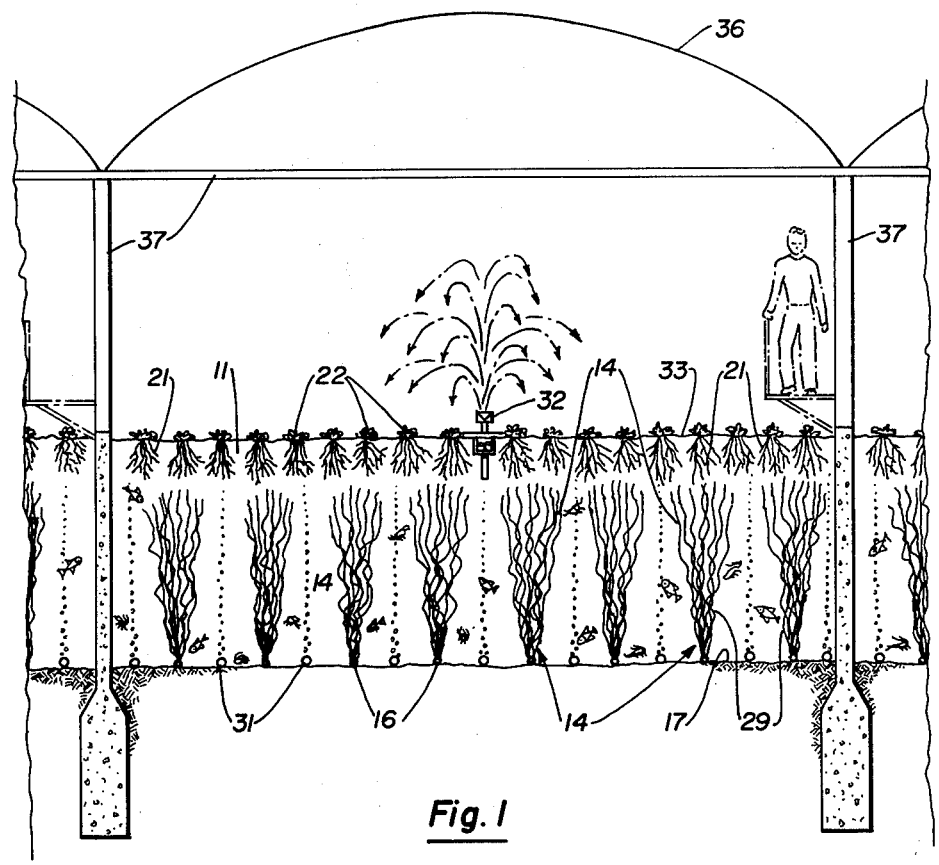
FIG. 1 is a vertical cross-sectional view of a portion of the wastewater treatment structure of the present invention, taken substantially on the plane of line 1—1 of FIG. 2.
Figure 2:
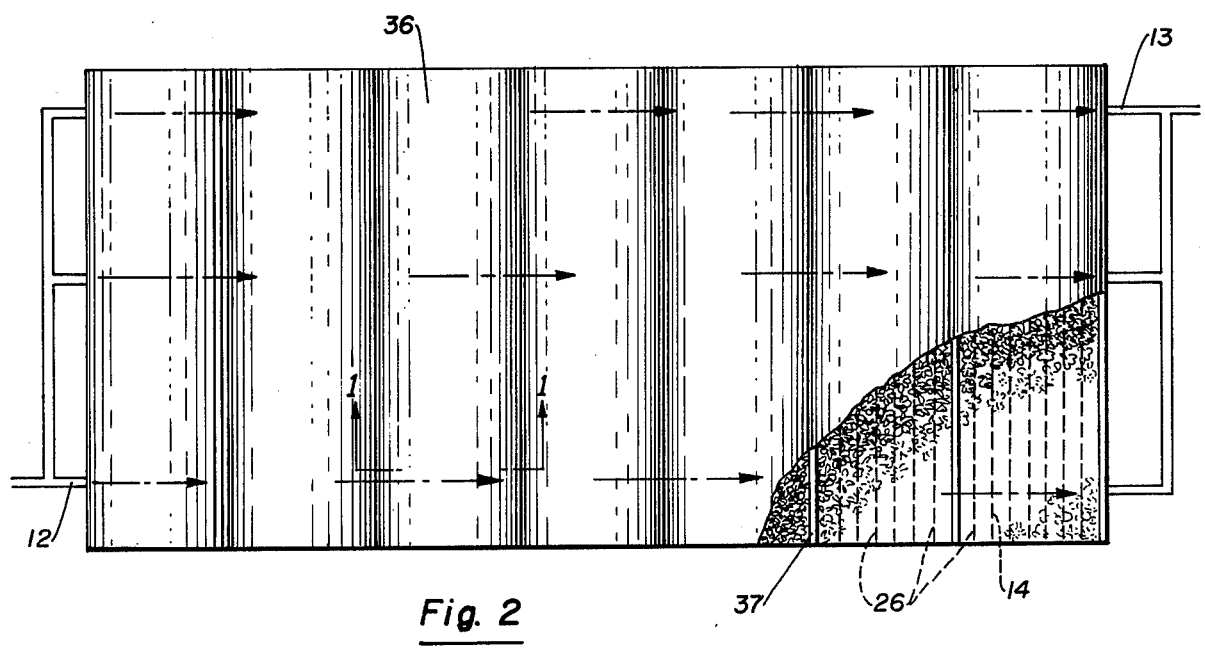
FIG. 2 is a plan view of the structure partially broken away to show interior features.

The water treatment system of the present invention comprises, briefly, a body of water 6, such as a pond or lagoon; inlet means 12 connected to the body and adapted for connection to a source of polluted water, e.g., sewage, industrial or agricultural wastewater, for delivery of the polluted water to water body 6; water discharge means 13 connected to water body 6 remote from inlet means 12; the inlet and discharge means regulating the flow of water into and from the body proportioned to the total volume of the body to provide a residence of water in the body of at least 24 hours; and high-surface-area, bacteria-supporting substrate 14 submerged in the water body and positioned for traversing by water flowing from inlet 12 to outlet 13, the substrate having:

(a) a ratio of surface area to volume of substrate in excess of 1,000 to 1, with substantially all of such area exposed to water flow thereover and accessible for movement thereover of grazing invertebrates, and (b) a ratio of surface area to the volume of water surrounding the area of at least 1 to 1.

Substrate 14 preferably comprises a plurality of lengths of high-surface-area synthetic, substantially non-biodegradable material which is deployed in the water at a plurality of levels over the depth of the water for assuring water flow thereover on passage of water from inlet 12 to outlet 13. The primary function of the very high-surface-area, submerged substrate is to support and encourage the growth of bacteria, which are thus distributed and maintained evenly and uniformly throughout the whole water column, where they are free to absorb oxygen and nutrients continuously throughout the long holding period or residence time of the polluted water within the treatment structure—at least 24 hours and preferably 2-3 days. The substrate also provides support and food for micro-invertebrates such as amphipods and other grazers which form part of the food chain of the present invention; and larger organisms, such as fresh water shrimp, crayfish and other macro-invertebrates, as well as vertebrates, such as fish, can pass through, between and over the bio-web substrates and graze upon the micro-invertebrates thereon.

The substrate may comprise sheets, strips, strands, grass, fiber, or the like, or lengths of open-cell foam. The material forming the bio-web substrate may be disposed in any fashion, in horizontal layers or vertically, so long as it is dispersed throughout the depth of the water for full submersion of the substrate and for support of crustaceans or the like which may move over, be supported on, and feed upon the amphipods and other micro-invertebrates which are attracted to and feed upon the bacteria, detritus and particulate waste which will accumulate and grow on the substrate.

As a feature of the present structure, the substrate may have a density less than water and be submerged by means 16 anchoring lengths of flexible plastic sheets or strips at the bottom 17 of the water body for buoyant disposition of the lengths of substrate in a generally vertical orientation, as seen in FIG. 1, and with the lengths extending over at least the majority of the water column containing the lengths. Substantial water depths may be advantageously used in the present system to minimize the required size of the pond. For example, an 8' depth of water affords a two-day retention time for 1,000,000 gallons per day polluted water input into a 1-acre pond. Preferably, the substrate strips will extend over about ¾ of the depth of the water approaching the lower ends of the depending roots 21 of the floating macrophytes 22, discussed below.

Figure 4:
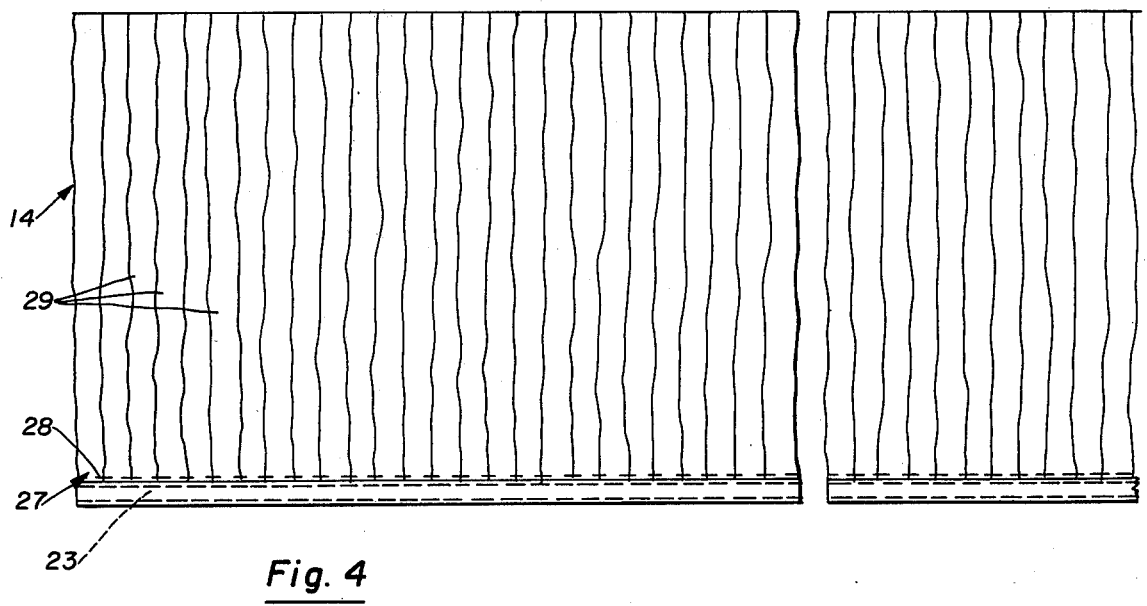
FIG. 4 is a side elevation of the structure illustrated in FIG. 3.

A preferred means for anchoring the floating substrate lengths comprises an elongated weighted member 23, see FIG. 4, which will serve as a submerged anchor resting on the pond bottom 17 and for the securing of one end of the substrate strips thereto in longitudinally spaced relation along the length of the member for floating upwardly therefrom and to provide a flexible, buoyant, upstanding, permeable curtain in which the mass of buoyant strips are free to move relative to each other and with the water movement and in response to the engagement therewith of fish, etc. Preferably also, members 23 are positioned to provide spaced-apart rows of upwardly floating substrate strips, thus defining elongated channels for controlled movement of the grazing organisms, such as fish, and to prevent overgrazing of the important detritivore invertebrate organisms, such as snails and amphipods.

Figure 3:
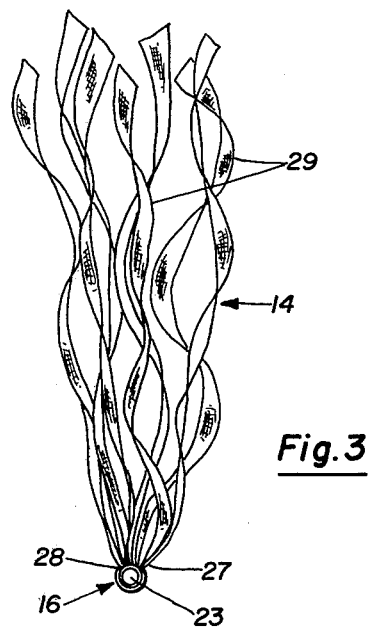
FIG. 3 is an end elevation of a portion of the apparatus of the present invention.

The bio-web substrates may be conveniently constructed from a multiplicity of superimposed plastic sheets 27 having a thickness of about 8 mils. first piled as a stack and then wrapped at a medial portion of the stack around member 23 and being suitably secured as by fastening means 28, such as clips shown in FIG. 3 or lacing shown in FIG. 4. The multiplicity of layers of sheets thus extending from member 23 may then be slitted perpendicularly to member 23 to provide a mass of individually freely articulating, floating strips 29 forming the permeable curtain. Typically, 20 or more such thin plastic sheets may be stacked in the foregoing construction to provide 40 or more confronting, upwardly floating strips 29 at each of the longitudinally spaced locations along the length of the assembly. Preferably and as here shown, the length of the substrate assemblies and the plane of the permeable curtain formed thereby is positioned substantially normal to the water flow through the pond from inlet 12 to discharge 13, although an arrangement of the curtain and rows parallel to the water flow will also function. Preferred materials for the substrate strips are polypropylene and polyethylene films or mesh screen.

The activated bio-web substrate, as above explained, is a key to the support and flourishing of the three-level food chain forming part of the present structure. As will be understood, the pollutants in the water, which consist of dissolved nutrients and particulate matter, are concentrated in each of the several steps of the food chain. In the first step, such pollutants are concentrated by the bacterial food chain level. The second step concentrates the pollutants through the detritivore microinvertebrate grazing level. The third concentration is obtained at the macro-invertebrate and fish food level. Environmental studies have shown that the organic matter can be concentrated to an average of 1/10 its existing mass as it passes through each step of the food chain. Therefore, the net bio-mass of solid material entering the ponds can be reduced to about 1/1,000 by means of the food chain process.

Another feature of the present construction is the use of means 31 for aerating and moving the water and which functions importantly with the bio-web substrate in distributing the required nutrients and oxygen to the bacteria on the substrate. Two types of aerators are here used: (1) submerged perforated air diffusers 31, which may be disposed as illustrated on the bottom 17 of the pond, and (2) a floating aerator 32, which functions as hereinafter more fully explained to spray water from the surface 33 into the atmosphere for both aeration and heating. The bacteria on the substrate, forming the first step of the food chain, require oxygen for metabolism and nutrients for growth, i.e., bacteria require oxygen in order to metabolize the nutrients that they absorb out of the wastewater in their process of cleaning or treating the wastewater. Wastewater typically consists of three components: the dissolved nutrients which are in molecular form, such as ammonia, nitrates, phosphates, and other components; the particulate components comprising the suspended solids; and the settle-able solids. To purify wastewater, all of these elements need be removed. The chief function of the bio-web substrate is to allow for the attachment and development of high densities of bacteria which will absorb through their cell wall the dissolved nutrients, as well as remove the suspended particulate matter by means of coagulation, precipitation, and physical entrapment, as well as to aid in the removal of the larger settle-able solids by creating physical barriers which inhibit the larger solids from passing out of the pond. In other words, the bio-web substrate acts as a barrier against which solid matter will impinge. There is not only transport by adsorption and absorption of nutrients into the bacteria for utilization, but also external enzymatic degradation of particulate matter by the bacteria occurs in order to utilize the nutrients available in the particulate matter adhering to the substrate. The upwardly floating bio-web strands also impede the upwardly moving air bubbles from air tubes 31 and help to detain and disperse the air and enhance oxygen transfer into the water.

The combination of the activated bio-web substrate and aeration provides a much improved environment for use of conventional algae treatment ponds, since the bio-web substrate will provide a stable, reliable bacterial process for treating during periods when algae fluctuate in their growth and/or die. The algae system alone lacks the reliability factor, which leads to the requirement of having ponds of enormous size. With the assist afforded by the bio-web substrate/aeration combination, large pond areas otherwise required to care for winter periods, cloudy days, or upset periods when the algae may die may be substantially reduced because the bacteria functioning on the bio-web substrate will always be present and prepared to operate as necessary.

Another feature of the present structure is the use of living, floating aquatic macrophytes 22 on the surface of the pond and which are nurtured by the pollutants in the wastewater. The use of floating aquatic macrophytes in combination with the substrate and aeration provides a number of interlocking advantages:

(1) The plants adsorb particulates and absorb the dissolved nutrients from the wastewater, thereby removing pollutants directly from the water and incorporating them into their tissues and onto plant surfaces.

(2) The plants function to provide shade which prevents growth of algae, otherwise known as microphotosynthetic organisms, which cause problems with wastewater in that their small cells are very difficult to harvest and, therefore, remain in the effluent. When the effluent contains the algae cells, the effluent still has what is considered a high suspended particulate matter (suspended solids) and this suspended matter of algae cells exerts a biological oxygen demand on the receiving waters when it dies and breaks down. The algae must eventually die and break down and exert this BOD because it has such a short life cycle that within a few days, if it does not receive continued sunlight and nutrient proper to its requirements, it will die and end up, repolluting the water that it initially purified.

(3) The plants have an extensive, fibrous root system extending down into the water and to provide surface area in a manner similar to the bio-web substrates, thus providing surface area for bacterial attachment and grazing of the micro- and macro-invertebrates.

(4) The surface area provided by the floating plants acts to physically entrap both the suspended solids and the settle-able or larger particulate solid wastes. The aquatic plants are easy to harvest, and when harvested carry with them the suspended solids and particulate settle-able solids which are thus mechanically removed from the wastewater and do not need to be treated by the bacteria or food chain processes in the water.

(5) During the nighttime when plants require oxygen for their metabolism, the required oxygen is drawn from the air above the water and not from the water itself. This is an advantage over the micro-photosynthetic plants or algae, which, although they serve to provide oxygen during the daytime or sunlit hours, reverse their process and draw the oxygen out of the water at night, thereby reducing the effectiveness of the bacterial processes, since they compete with the bacteria for the oxygen during the night hours.

Various floating aquatic macrophytes may be used, including water hyacinths, duckweeds (lemancea) and water lettuce. Water hyacinths provide particular and unique advantages when used in the present invention, due to the combination of long, dendritic-like root structures for the adsorption and physical removal of suspended solids and the capability of water hyacinths to absorb deleterious materials, such as heavy metals and persistent organic hydrocarbons. Water hyacinths provide a valuable by-product for fuel, animal feed and compost. The water hyacinth is an unusually durable, very hardy species. Another attribute is its phenomenally high growth rate, having recorded doubling rates of bio-mass within a two-week period, and has been known to produce 60 tons dry weight per acre per year of bio-mass. The arrangement of the fully submerged and subterranean support for the bio-web substrates leaves the water surface 33 free for growth of water hyacinths and their easy removal and harvesting without in anywise disturbing the underlying substrate structure.

Preferably, the macrophytes are used in combination of two or more of the following: water hyacinths, duckweed, water lettuce and water fern. An advantage in using the combination of water hyacinths and duckweed is that, in the harvesting of the water hyacinths, the open space which is left can be fairly quickly filled by the smaller duckweeds which move more readily over and into the open areas, thereby shading and preventing algae growth from occurring during the period of regrowth of the water hyacinth. Another advantage of the combination of plants is that, because certain species are known to remove slightly greater amounts of different chemicals in the water, the combined plant process can act more effectively to totally purify any particular wastewater. For example, certain duckweeds are known to remove greater amounts of boron than will water hyacinths, and, therefore, the combination together in certain waters high in boron will be more effective than either one plant alone. Water ferns, azolla, have the ability to utilize nitrogen or fixed nitrogen out of the air rather than requiring to remove it from the water. The importance of this advantage of this characteristic is that in waters which have high levels of phosphate or other elements and which are very low in nitrogen, the azolla can still get the proper balance of nitrogen for its metabolism and growth to enable it to remove the other chemicals simultaneously.

As a further feature of the present invention, a light-transmitting, heat-retaining cover 36 is mounted over the pond and provides a substantial enclosure for the water body and the macrophytes. This covering may be a simple greenhouse-type enclosure comprising a plastic sheet appropriately carried on a supporting structure 37. The greenhouse enclosure provided by cover 36 enables the plants to grow in a relatively constant and moist or humid environment which is substantially unaffected by weather changes, storms, predators, insects or other competing organisms. It also acts to retain higher water temperature by retaining heat that is derived both from the incoming sewage water and the solar energy heat collected by the solar membrane 36 during the daylight hours. Heat thus retained promotes warmer air temperatures for growth of tropical plants and also provides the transfer of heat into the water, thereby increasing the metabolic rate and treatment efficiency of the bacteria and invertebrates in the pond. The greenhouse covering and solar heating source provided thereby enable the plants to operate relatively efficiently during the winter or colder periods of the year. Therefore, the treatment area does not have to be made very much larger in order to obtain year-round water treatment. For example, conventional wastewater treatment lagoons are typically 10-20 times larger than required for operation during the summer months. The enclosure also dampens diurnal fluctuations, a particularly important feature in desert climates having hot days and cold nights, which might otherwise kill many of the aquatic plants used in the present process.

The enclosure also tends to contain or entrap the carbon dioxide given off by the bacteria and microinvertebrate metabolism in the water. This carbon dioxide is then used by the plants for their metabolism during photosynthesis and enhances the rate of plant growth. As will be noted, this inter-relationship is obtained by the inter-related functioning of the solar covering, the macrophytes and the activated bio-web substrates.

Another advantage of the solar greenhouse enclosure is that, if a disruption in the treatment process were to occur, the possible odors released from anaerobic degradation would not escape to the atmosphere, and the air would be contained and purified by the polyculture and aeration within a short period after normal treatment processes are resumed.

Another important advantage of the greenhouse enclosure is the prevention of loss of water from the pond through evaporation. Water vapor, either direct from the pond or through evapotranspiration of the plants, condenses on the interior surface of cover 36 and drains back into the pond. This is a major advantage in an area where water has a high dissolved salt content. In the case of conventional water treatment lagoons, evaporation increases the salt content in the water to the point above acceptable levels for agricultural, drinking or industrial use. Of course, the water saved has significant value in many arid parts of the world.

Finally, the greenhouse enclosure prevents disturbance of plants such as duckweed, which, in an open lagoon, may be blown to one side by wind.

Advantage is taken of the heated air space or plenum over the water surface 33 and under the solar-transmitting cover 36 for transmitting heat to the water and for maintaining an elevated humidity within the greenhouse enclosure. As here shown, a surface aerator is floated on the water surface 33 and functions to spray water from the surface up into the heated air plenum, thus transferring heat to the water spray, which returns to the pond, and effecting vaporation for maintaining high humidity. At the same time, the evaporating water spray functions to cool the air, thus providing a proper temperature for optimum growth of the macrophytes without forced-air ventilation normally required in greenhouse structures. Foliar-feeding of the macrophytes with nutrient-laden water also occurs, as well as the removal of pests from the macrophytes by the water spray, and finally the stirring of the water itself to bring nutrient-laden water into greater contact with the macrophytes and activated bio-web substrate.

A floating mechanical aerator water spray unit may be used in the present structure. Cover 36 may comprise one or more sheets of plastic, such as polyethylene, which may be supported by a suitable skeleton structure, air inflation or the like, or may be made of a rigid light-transmitting material, such as Fiberglass, glass or the like.

What is claimed is:

1. A method for purifying polluted water comprising:
   flowing water to be purified into and through an earthened pond at a rate providing an average water residency of at least about 24 hours;
   suspending in said water a plurality of groups of bottom anchored flexible buoyant, non-biodegradable high-surface-area substrates maintaining an unobstructed water surface;
   each of said substrates being of elongated form and constructed to float upwardly from its anchor in a generally vertical orientation of its length with the majority of said substrates extending over at leas the majority of the depth of water in said pond;
   contacting suspended particulates in said water with said substrates to effect agglomeration and sedimentation of suspended particulates; and
   contacting the dissolved pollutants in said water with microorganisms on said substrates to effect biligical uptake and metabolism of said dissolved pollutants and removal thereof form said water.

2. The method of claim 1, and
   aerating said pond to stimulate water movement and the aforesaid contacts and to supply oxygen for the microorganisms;
   growing living floating aquatic plants on the surface of said pond and thereby
      a. absorbing, metabolizing and removing both particulate and dissolved pollutants in said water; and
      b. shading the water in said pond from sunlight and attendant growth of suspended algae;
   shielding said plants against wind displacement and predators;
   retaining carbon dioxide emitted by said microorganisms in position for utilization by said plants;

establishing and maintaining an elevated humidity for encouraging plant growth and inhibiting evaporative losses from said plants and pond and controlling salinity of said water; and removing said plants and associated bio-mass.

3. A water treatment system comprising an earthened pond and water therein;

inlet means connected to said pond and adapted for connection to a source of polluted water for delivery of polluted water to said pond;

water discharge means connected to said pond remote from said inlet means;

said inlet and discharge means regulating the flow of water through said pond to provide a residence of water in said pond of at least 24 hours;

a plurality of groups of high-surface-area substrates for supporting microorganisms distributed in said pond for traversing by water flowing therethrough, said substrates being of lighter than water and non-biodegradable material;

a heavier than water anchor secured to one end of each substrate for support thereof on the bottom of said pond; and each of said substrates being of elongated form and constructed to float upwardly from said anchor in a generally vertical orientation of its length with the majority of said substrates extending over at least the majority of the depth of water in said pond.

4. The structure of claim 3, means for aerating and moving said water; and living floating aquatic macrophytes supported on the surface of and nurtured by said water and having depending roots in proximity to upper portions of said substrates.

5. The structure of claim 4, said macrophytes comprising water hyacinths.

6. The structure of claim 4, said macrophytes comprising at least two of the following: water hyacinths, duckweed, water lettuce and water fern.

7. The structure of claim 4, and a light-transmitting, heat-retaining covering providing a substantial enclosure for said body and macrophytes.

8. The structure of claim 4, and a light-transmitting, heat-retaining cover, extending over the surface of said water in spaced relation thereto providing a solar-heated air space under said cover; and means for spraying water from said body into said air space.

9. The structure of claim 3, and a light-transmitting, heat-retaining covering extending over the surface of said water.

10. The structure of claim 3, said anchor comprising an elongated weighted member, and said substrate lengths being secured at one end thereto in longitudinally-spaced relation along the length of said member and floating upwardly therefrom to provide a flexible permeable curtain.

11. The structure of claim 10, and a plurality of said members positioned to provide spaced-apart rows of upwardly floating substrate strips.

12. The structure of claim 10, said substrate lengths being formed of a multiplicity of parallel plastic sheets having medial portions secured to said member and extending therefrom in a multiplicity of layers, said sheets being slitted perpendicularly to said member to provide a mass of upwardly floating strips forming said curtain.

13. The structure of claim 12, said substrate consisting of one of the class of polypropylene and polyethylene.

* * * * *

UNITED STATES PATENT AND TRADEMARK OFFICE
CERTIFICATE OF CORRECTION

PATENT NO. : 4,169,050
DATED : September 25, 1979
INVENTOR(S) : Stevan A. Serfling and Dominick Mendola It is certified that error appears in the above-identified patent and that said Letters Patent are hereby corrected as shown below:

IN THE SPECIFICATION:

Column 10, line 14, delete "vaporation" and insert

---evaporation---.

IN THE CLAIMS:

Column 10, line 45, delete "leas" and insert ---least---; and line 53, delete "form" and insert ---from---.

Signed and Sealed this

Eleventh Day of December 1979

[SEAL]

Attest:

SIDNEY A. DIAMOND

Attesting Officer

Commissioner of Patents and Trademarks